Figure 20:
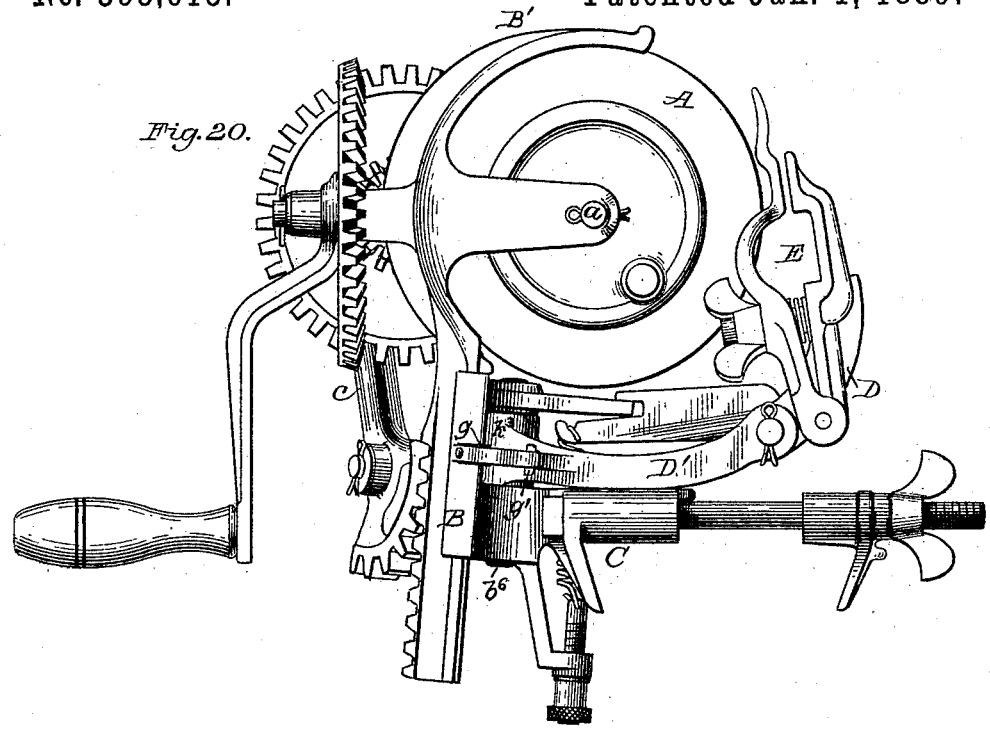

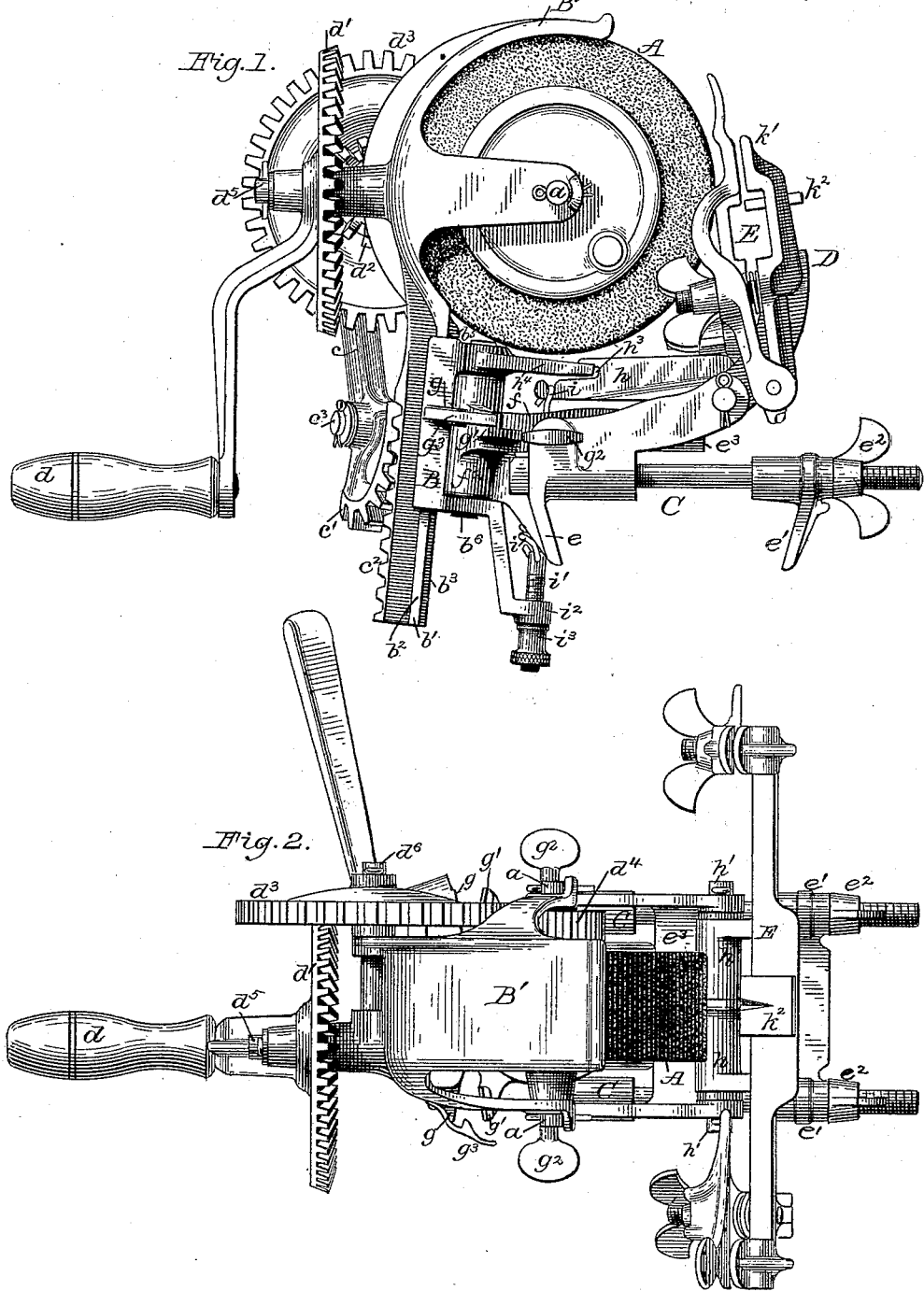

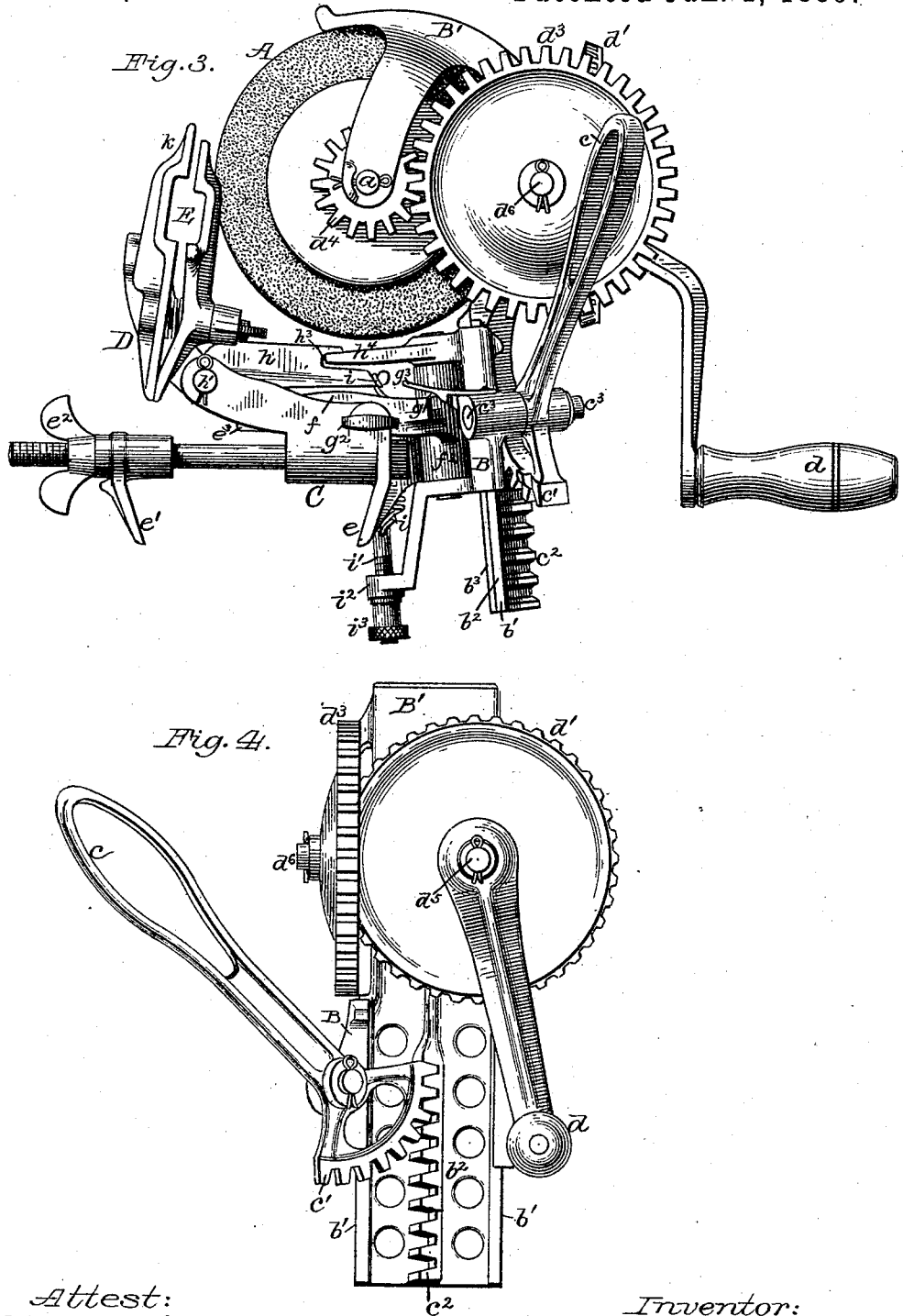

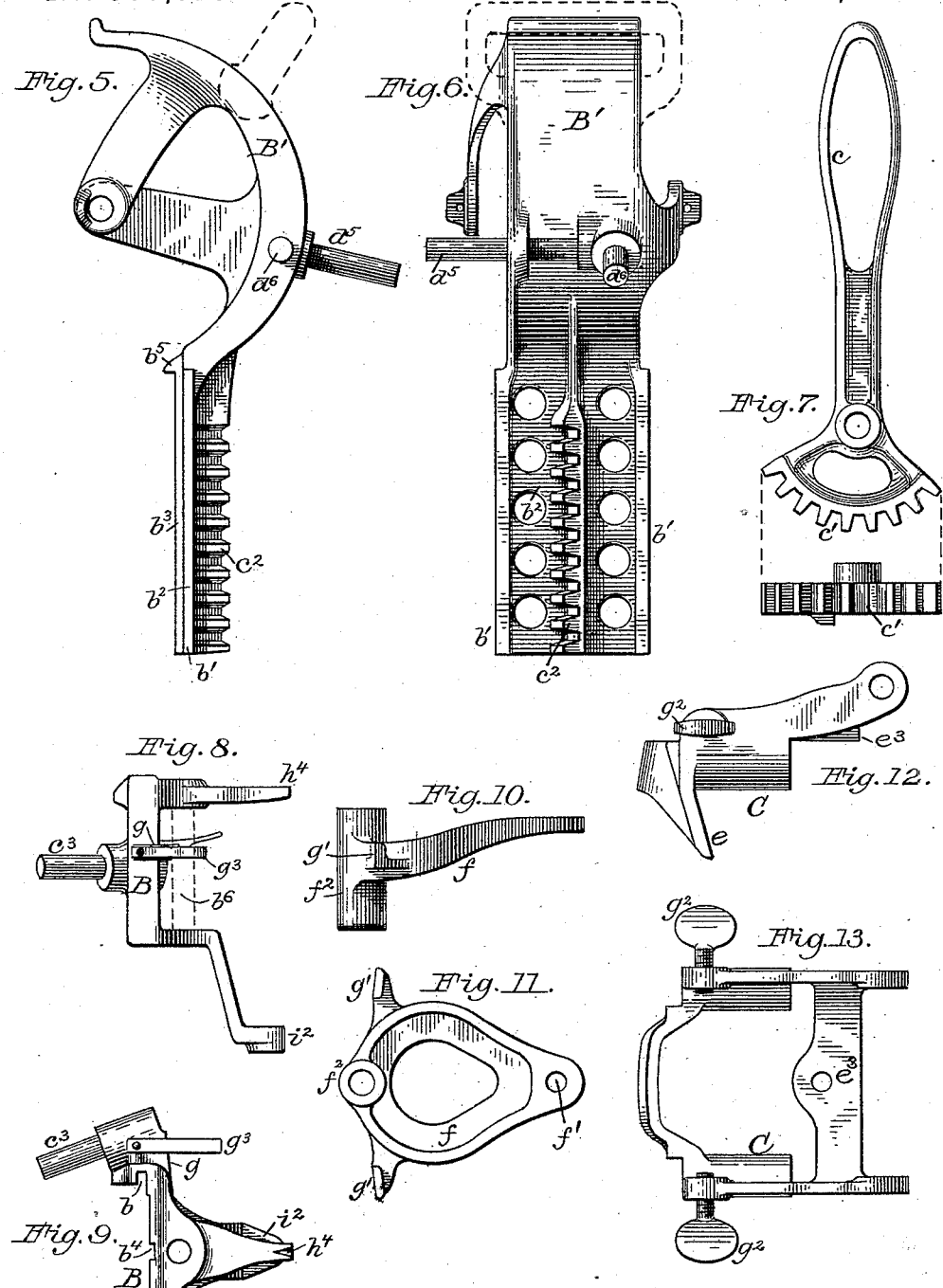

(Model.)
6 Sheets—Sheet 4.
R. DUTTON.
MACHINE FOR GRINDING MOWER KNIVES.
No. 395,615.
Patented Jan. 1, 1889.
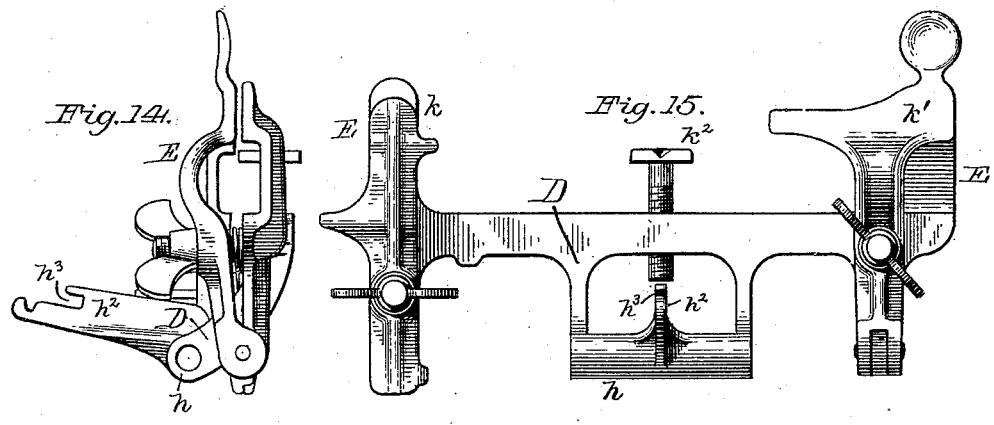
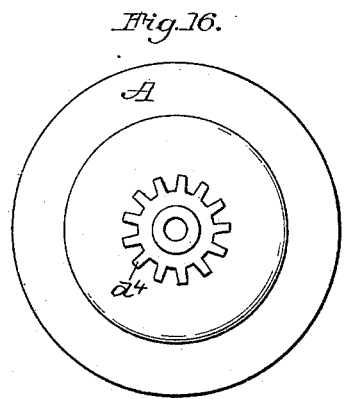
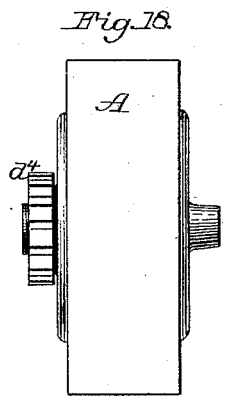
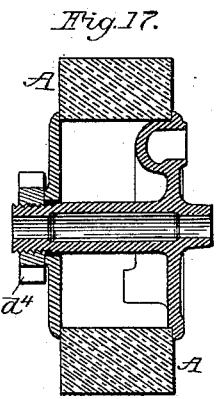
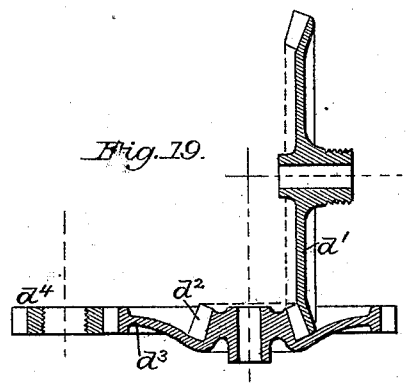
Attest:
Philip F. Larner
Howell Bartlett
Inventor:
Rufus Dutton.
By McC Wood
Attorney.

(Model.) 6 Sheets—Sheet 5.
R. DUTTON.
MACHINE FOR GRINDING MOWER KNIVES.

No. 395,615. Patented Jan. 1, 1889.

Attest:
Philip F. Larner
Howell Bartle

Inventor:
Rufus Dutton.
By Wm. O. Wood
Attorney.

(Model.) 6 Sheets—Sheet 6.

R. DUTTON.
MACHINE FOR GRINDING MOWER KNIVES.

No. 395,615. Patented Jan. 1, 1889.

Attest:
Philip F. Larner
Howell Battle

Inventor:
Rufus Dutton.
By
Attorney.

UNITED STATES PATENT OFFICE.

RUFUS DUTTON, OF NEW YORK, N. Y., ASSIGNOR TO THE MOWER KNIFE GRINDER COMPANY, OF SAME PLACE.

MACHINE FOR GRINDING MOWER-KNIVES.

SPECIFICATION forming part of Letters Patent No. 395,615, dated January 1, 1889.

Application filed October 22, 1887. Serial No. 253,077. (Model.)

*To all whom it may concern:*

Be it known that I, RUFUS DUTTON, of the city and county of New York, in the State of New York, have invented certain new and useful Improvements in Machines for Grinding Mower-Knives; and I do hereby declare that the following specification, taken in connection with the drawings furnished and forming a part thereof, is a clear, true, and complete description of the several features of my invention.

My said improvements have been devised with special reference to machines embodying more or less of the several improvements heretofore devised by me and disclosed in my Letters Patent No. 342,290, May 18, 1886, and No. 359,964, March 22, 1887; and one object of my present invention is to reduce to a minimum the bulk and weight of such forms of my machines as are organized for field service without impairing their effective strength and durability, and this I have so far accomplished that my present machines weigh only about five-eighths as much as the first which were made by me for field service. A similar reduction in bulk has also been attained; but this is due largely to a rearrangement of parts of the machine, and as a result of these reductions in bulk and weight the cost of construction has been materially lessened, as well as the cost of boxing, freight, and handling.

Another object of my present invention is to place the points of contact between the grinding-surface and a knife more completely beneath the eye of the operator than is possible in the use of my prior field-machines, and this I have accomplished by a reorganization of the gearing and grinding-wheel crank and lever with the mechanism by which said wheel is reciprocated while revolving, said crank and lever being now so arranged that the operator can stand facing one side of the grinding-wheel and over the knife-clamp, instead of at the rear thereof and facing the edge of the wheel remote from said clamp, as with my prior field-machines.

Various other minor advantages accrue from my present invention, as will hereinafter be made apparent, and after describing the machines illustrated in the drawings the features deemed novel will be specified in the several clauses of claim hereunto annexed.

Figure 23:
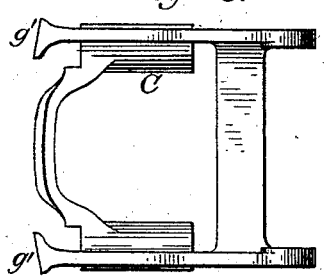
Figure 21:
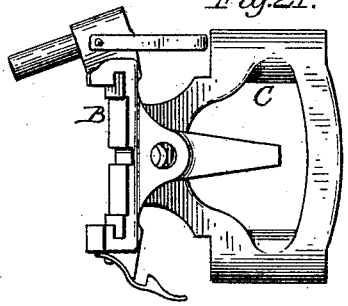
Figure 22:
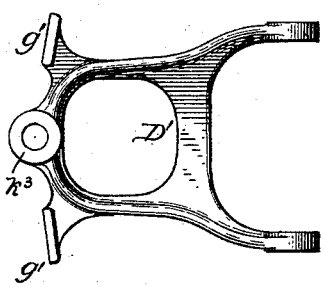
Figure 24:
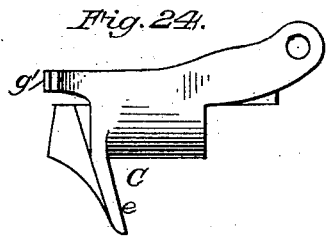
Figure 25:
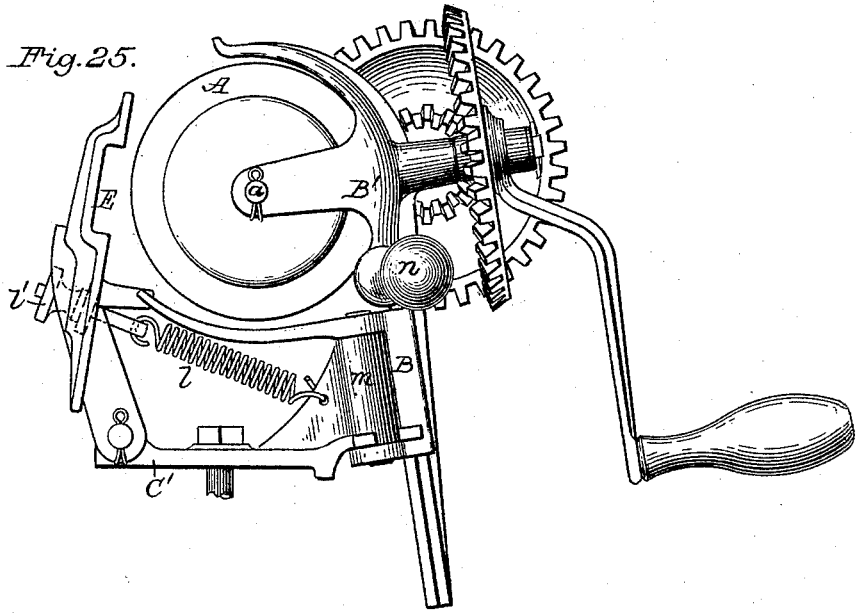
Figure 26:
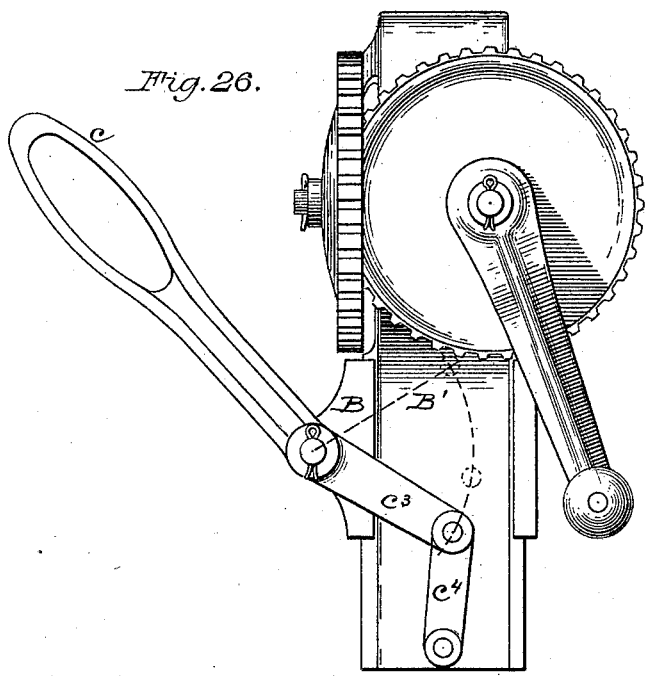

Referring to the six sheets of drawings, Figures 1 and 2, Sheet 1, illustrate one of my improved machines in its most approved form, respectively in side elevation and in top or plan view. Fig. 3 illustrates the same in a view at the side opposite to that shown in Fig. 1. Fig. 4 illustrates a portion of the same in end view. Figs. 5 and 6, in side and end views, illustrate the upper portion of the grinding-wheel frame or wheel-arm detached. Fig. 7, in two views, illustrates the lifting hand-lever by which the grinding-wheel is reciprocated. Figs. 8 and 9 illustrate, respectively in side and top views, the lower or base portion of the grinding-wheel frame. Figs. 10 and 11, in side and top views, illustrate a pivoted stop-plate detached from the machine. Figs. 12 and 13, in side and top views, illustrate a portion of the base-clamp and its frame. Figs. 14 and 15 are end and side views of the knife-clamp. Figs. 16, 17, and 18 illustrate the grinding-wheel in side view, section, and edge view. Fig. 19 illustrates the gearing in section. Fig. 20, in side elevation, illustrates one of my improved machines in a modified form. Fig. 21 is a top view of a base-clamp detached from the machine, Fig. 20. Fig. 22 is a top view of the base portion of the knife-clamp frame of said machine. Figs. 23 and 24 are respectively top and side views of a portion of a base-clamp adapted for use in machines otherwise like that shown in Fig. 1, as a partial substitute for the parts shown in Figs. 10 to 13, inclusive. Fig. 25, in side view, illustrates a machine embodying portions of my present improvements, but adapted to be permanently mounted upon a mowing-machine. Fig. 26 is an end view generally corresponding to Fig. 4, but illustrates a hand-lever and link as a grinding-wheel lifting device in lieu of the segment gear-lever and rack shown in said Fig. 4.

The grinding-wheel A in each of the forms of machine shown has a flat grinding-face at its periphery, an interior water-chamber, and a feed-duct, and it is provided with a hollow flanged axial hub, and is mounted on a non-rotative shaft, $a$, substantially as heretofore used by me and as disclosed in my aforesaid prior patents.

I will first describe the form of machine illustrated in Figs. 1 to 19, inclusive.

In this machine the wheel-frame is composed of two main parts, B and B'. The lower part, B, serves as the base portion of the wheel-frame and is in the form of a supporting-bracket which is swiveled or pivoted so as to swing to and fro laterally. The upper part, B', is that in which the grinding-wheel is partially inclosed and directly mounted, and it serves as a wheel-arm, to which vertical motion is imparted for affording the requisite reciprocation of the wheel while grinding a mower-knife. These two parts of the wheel-frame are united in a novel manner, so that while both can be swung laterally as one frame to and fro on its pivot, the wheel-arm portion can be moved up and down, carrying the grinding-wheel. The base portion of the frame has two parallel vertical guide-bearings, $b$, and to these the sides $b'$ of a flat tail-piece, $b^2$, are accurately fitted. This tail-piece $b^2$ has on its rear side a spline or web, $b^3$, which occupies a vertical central groove, $b^4$, in the front face of the base portion B of the wheel-frame, as clearly indicated in Figs. 5 and 9. This combination of the tail-piece having a central web and the wheel-frame base having a central groove, and also having the guide-bearings for the sides of the tail-piece, enables desirable results to be obtained at little cost in machining, it being obvious that the central web will only require the fitting of its two edges to its groove to secure the tail-piece against lateral or edgewise displacement, and that the sides $b'$ of the tail-piece need only to be ground for properly occupying the guides $b$, without providing for a bearing-contact of the edges of the tail-piece in said guide-bearings. At the top of the web $b^3$ there is a shoulder, $b^5$, which limits the downward movement of the wheel-frame arm by abutting upon the top edge of the base portion B of the wheel-frame. The wheel-frame arm with a tail-piece thus constructed and provided with guide-bearings, as described, is truly guided during its reciprocating movements and with a minimum of friction at the several points of contact, and the said arm with all its parts can be readily detached from the rest of the machine. In this machine said reciprocating movement is effected by means of a hand-lever, $c$, a segmental gear, $c'$, thereon, and a rack-gear, $c^2$, on the back of the tail-piece $b^2$, the lever being pivoted upon a stud, $c^3$, projecting angularly from the base portion B of the wheel-frame, and its gearing is so arranged that said lever stands out at one side of the machine in a position convenient for manipulation during the grinding operation.

The grinding-wheel is driven by the hand-crank $d$, attached to the hub of a beveled driving-gear, $d'$, which meshes with a bevel-gear, $d^2$, integral with or on the hub of a larger gear, $d^3$, which in turn meshes with a smaller gear, $d^4$, on the flanged hub of the grinding-wheel A. The gearing organized as indicated is usually arranged to afford nine or ten revolutions of the grinding-wheel to each revolution of the crank.

The driving-gear $d'$ is mounted at right angles to the axis of the grinding-wheel on a stud, $d^5$, and the gears $d^2$ and $d^3$ are mounted on a stud, $d^6$, parallel with said axis, and both of said studs projecting from the wheel-arm portion B' of the frame and standing at right angles to each other. The non-rotative shaft $a$, on which the grinding-wheel A and gear $d^4$ are mounted, is supported on portions of the frame which are in the same horizontal plane as that occupied by the studs $d^5$ and $d^6$. This combination of the grinding-wheel, the frame-arm, and the crank standing at right angles to the axis of the wheel, and with the gearing and crank mounted on studs projecting from said frame-arm, is of practical value as a novel feature of construction, not only with reference to compactness and economy, but also with reference to assembling the parts and mounting them as a whole in a machine, or in readily transferring them from one machine to another, in the event of such breakage of both as would render a reassembling of parts desirable.

The base-clamp frame C, by which the machine can be readily mounted upon a mowing-machine for service in the field, is substantially as heretofore, having the same fixed jaws, $e$, movable jaws $e'$, and thumb-nuts $e^2$. The wheel-frame is pivoted to this base-clamp frame as follows: Between the base-clamp frame C and the base portion B of the wheel-frame an adjustable stop-plate, $f$, is interposed, and this plate, as in one form of my prior machines, also serves as the coupling medium between the wheel-frame and the base-clamp frame. Said stop-plate, at one end, is pivoted at $f'$, Figs. 10 and 11, to a cross-bar, $e^3$, Figs. 12 and 13, so that its opposite end may swing in a horizontal plane, and at the said opposite end said stop-plate has a vertical hollow hub or sleeve, $f^2$. The wheel-frame base B, Figs. 8 and 9, is bored to receive a pivot-bolt, $b^6$, (see Fig. 1, and also shown in dotted lines in Fig. 8,) and said bolt in said sleeve $f^2$ couples the wheel-frame to the base-clamp, thus providing for a double pivotal connection, one pivotal point being at the junction of the wheel-frame base with the stop-plate $f$ and the other being at the junction of the opposite end of said plate with the base-clamp frame.

Upon the wheel-frame base B there are two stop-abutments, $g$, and on the stop-plate there are stop-faces $g'$, which, by engagement with said abutments, limit or restrict the swiveling movement of the wheel-frame with relation to the stop-plate. At each side of the base-clamp there is a lateral adjusting-screw, $g^2$, and these by engaging at their inner ends with the coincident surfaces of the stop-plate variably restrict the swiveling movement of said plate with relation to the base-clamp frame or other foundation of the machine. These stops $g\ g'$ are provided with thumb-latches $g^3$, which lock the wheel-frame in either position of adjustment, according to which pair of the stops may be in contact. This feature of varying the position of the pivotal point of the wheel-frame is of practical value only for enabling a variety of bevels to be ground—as when operating upon a mower-knife previously irregularly ground—and therefore an adjustable stop-plate need not be always employed in my machines.

The knife-clamp frame D (see Figs. 14 and 15) has a hollow sleeve, $h$, by which and a horizontal rod or shaft, $h'$, it is hinged by a horizontal pivot on the base-clamp frame, (see Fig. 1,) and said sleeve has an arm, $h^2$, which projects toward the wheel-frame and is laterally notched, as at $h^3$, for the reception of a finger, $h^4$, which extends from the wheel-frame base and occupies said notch whenever said arm and finger occupy the same line, as when the machine is not in service. Said arm $h^2$ also serves as a lever, to which one end of a retractile spiral spring, $i$, is attached, its opposite end being coupled to an adjusting-screw, $i'$, passing through a pendent bracket, $i^2$, on the wheel-frame base and provided with a thumb-nut, $i^3$.

It will be seen that the knife-clamp E is normally inclined toward the face of the grinding-wheel, and also that the guide-bearings in which the frame-arm slides are inclined toward the knife-clamp, and therefore as the wheel is raised for grinding toward the tip of a knife-edge the clamp is forced rearward and the force of the spring increased, thus enabling the tips to be ground under an abrasive pressure equal to if not slightly greater than when grinding at or near the bottom of the V between any two knife-sections.

The knife-clamp E is in all essentials the same as that described in my aforesaid Letters Patent No. 359,964, and hence needs no special description of its two pairs of clamping-jaws $k\ k'$ and gaging-bolt $k^2$. It will be understood that a mower-knife is mounted in said clamp, with the rear edge of the knife downward and its blades or sections standing upward in a nearly-vertical position, and when properly adjusted for grinding the center of the head of the gaging-belt $k^2$ is opposite the bottom of a V between two adjacent knife-sections, a notch on said bolt-head serving as a gage-point. One or the other, or both, of the two pairs of clamping-jaws are caused to firmly grip such portions of the knife as may be interposed between their clamping-faces.

The spring $i$ in this machine forces the knife-clamp toward the face of the grinding-wheel in a manner similar to the corresponding spring shown in my Letters Patent No. 342,290, and it is without such means for directly varying its power during the rise and fall of the grinding-wheel, so as to cause heavier grinding contact at the tips of mower-knives than at their bases, as were disclosed in my Letters Patent No. 359,964; but I produce somewhat like results to a satisfactory degree by the inclination of the guide-bearings of the base-portion B of the wheel-frame hereinbefore described.

It will be readily seen that the main features of my invention are not dependent upon the inclination of the wheel-arm toward the knife-clamp, this latter being a feature involving a nicety in operation which many operators will fail to readily appreciate.

Now, referring to Figs. 1 and 2, it will be readily understood that an operator facing one side of the grinding-wheel can operate the driving-crank with his right hand, and while manipulating the lifting-lever with his left hand he will be able to place his head so directly above the knife-clamp that he may closely observe every part of the grinding operation, and thus obviate undue abrasion at any point on a knife-edge requiring but little grinding and avoid stopping the machine from time to time for enabling observation at those points where heavy grinding should occur, as when working out gaps or notches. It will also be seen that even when the machine is ready for service it is very compact, so that, in fact, such machines occupy a space but little greater than a cubic foot, and when the crank, the hand-lever, and the knife-clamp are disconnected and arranged for packing much less than a cubic foot of space will be occupied by the machine.

It will also be observed that, as in my prior machines, the wheel-frame is so hinged or pivoted with relation to the knife-clamp that the center of motion is within the flat-faced grinding-wheel, and that therefore the two adjacent edges of any two knife-sections can be consecutively ground without changing the position of the knife in the clamp, and thereby securing uniform bevels at the ground edges, in accordance with my said Letters Patent No. 342,290, and also that the adjustable stop-plate in this machine enables uniform bevels to be ground whenever practicable, while enabling knives which have been previously irregularly ground to be ground at such bevels as may be best suited in each case, all in accordance with my said Letters Patent No. 359,964.

In certain forms of my machine organized with reference to minimum cost, but at a consequent sacrifice of more or less of the desirable capacities of the better forms of machines, I construct the stop-faces $g'$ integrally on the base-clamp frame C, as shown in Figs. 23 and 24.

It must not be supposed that the advantages incident to a sliding frame-arm for the wheel and the system of gearing described will only accrue if restricted to a form of machine in which the wheel-frame is pivoted to swing laterally, because in one form of my machines, preferred by some operators, the grinding-wheel frame is non-pivotal, as illustrated in Figs. 20, 21, and 22. In this form of machine the grinding-wheel A and its frame-arm B' are precisely as in Fig. 1, and the same is true of the lifting-lever c, the driving-gearing, and the knife-clamp E. The knife-clamp frame is also the same at the part D; but this, instead of being pivoted to the base-clamp frame, is pivoted to one end of an extension, D', of said knife-clamp frame, which at its opposite end has a sleeve, $k^3$, occupied by the pivot-bolt $b^6$, so that the knife-clamp and its frame can be swung to and fro laterally on said pivot. The base portion B of the wheel-frame is in this case rigidly attached to or formed integrally with the base-clamp frame C, as is clearly indicated in Fig. 21, and the stop-faces $g'$ are therefore formed on the part D' of the knife-clamp frame, so as to engage with the abutments $g$ on the base portion B of the wheel-clamp frame.

I have found it desirable to embody the main portions of my present invention in a specially cheap but effective form of machine adapted to be mounted as a fixture on mowing-machines and reapers and to be sold therewith.

In Fig. 25 I show such a machine, wherein a simple base-plate, C', takes the place of the base-clamp frame, and this is permanently secured by a bolt to a pole or other desirable portion of a mowing-machine. The knife-clamp E is similar to that before described, although only partially illustrated here for better disclosing the knife-clamp spring $l$ and its adjusting-screw $l'$. The base-plate has a sleeve, $m$, occupied by the bolt, which pivotally unites the base portion B of the wheel-frame thereto, this latter part of the wheel-arm portion B', the wheel A, the gearing, and the driving-crank being substantially as before described; but no lifting-lever is here employed, because a simple laterally-projecting handle, $n$, is relied upon for raising and lowering the grinding-wheel, and instead of such a handle a mere hand-loop can be successfully employed, as is indicated in dotted lines in Fig. 5 on top of that portion of the wheel-frame arm B' which overlies the grinding-wheel and serves as a shield. This avoidance of a hand-lever is only of material consequence when the grinding-machine is to be permanently mounted at such points on a mowing-machine as will render it inconvenient or impracticable to operate a lever, as when the space requisite for said lever is not available.

While the hand-lever with the segmental gear and the rack on the wheel-arm portion of the frame is preferred by me, on account of its simplicity and cheapness, I obtain good results with a lever and a link, as illustrated in Fig. 26, wherein the lever $c$ has a simple straight end, $c^3$, which is coupled by a link, $c^4$, to the wheel-arm portion of the frame B', which has therefore no rack-gear thereon.

Having thus described my invention, I claim as new and desire to secure by Letters Patent—

1. In a mower-knife-grinding machine, the combination, substantially as hereinbefore described, of a flat-faced grinding-wheel, a knife-clamp, a knife-clamp frame, and a grinding-wheel frame, said frames being pivotally coupled with relation to each other to provide for lateral swinging adjustment, and said grinding-wheel frame being composed of two parts, one serving as an arm in which the wheel is mounted and sliding in said other part or base portion of said frame, a driving-crank mounted on a pivot on said arm portion of the frame at right angles to the axis of the grinding-wheel, and gearing, also mounted on said arm portion of the frame, for rotatively coupling said crank with the grinding-wheel.

2. In a mower-knife-grinding machine, a flat-faced grinding-wheel, a pivoted knife-clamp normally inclined toward the grinding-face of said wheel, a spring forcing said clamp toward the grinding-surface, and a sliding frame carrying said wheel and mounted in guide-bearings which are inclined toward said knife-clamp, substantially as described, whereby as the grinding-wheel is lifted by the sliding movement of its frame it will also be advanced toward a knife held in said clamp, and by forcing the latter rearward increase the force of said spring, and thus enable the tips of a knife-edge to be ground under abrasive pressure equal to that afforded while grinding the lower portion of the same edge.

3. In a mower-knife-grinding machine, the combination, substantially as described, of a knife-clamp, its frame, a flat-faced grinding-wheel and its frame, the latter being constructed in two parts, one sliding upon the other, a driving-crank standing at right angles to the axis of the grinding-wheel and coupled to said wheel by gearing, and a lever for lifting and lowering that portion of the wheel-frame in which said grinding-wheel is directly mounted.

4. In a mower-knife-grinding machine, the combination of a knife-clamp and a flat-faced grinding-wheel, both mounted in frames which are pivotally connected to admit of lateral swinging adjustment, stops for restricting said pivotal movement, and latches which confine or lock said stops when in position for service, substantially as described.

5. In a mower-knife-grinding machine, the combination, with the grinding-wheel, of a detachable wheel-frame arm in which said wheel is mounted, a hand-crank standing at right angles to the axis of the wheel and mounted on a stud projecting from said frame at the rear of said wheel, and gearing, also mounted on studs projecting from said frame, for coupling the crank with the grinding-wheel, substantially as described.

6. The combination, substantially as described, of the knife-clamp, the grinding-wheel, the sliding wheel-frame-arm provided with a tail-piece having a rack-gear thereon, and a hand-lever having a segmental gear engaging with said rack-gear for lifting and lowering said grinding-wheel while its face is in contact with a mower-knife held in said clamp.

7. The combination of the wheel-frame arm having a flat tail-piece provided with a central spline or web and the wheel-frame base provided with a central vertical groove for receiving said web, and also provided with guide-bearings for receiving the two edges of said tail-piece, substantially as described.

RUFUS DUTTON.

Witnesses:
C. H. PINKHAM, Jr.,
CLINTON B. DAVIS.